(12) United States Patent
Metz

(10) Patent No.: US 7,950,717 B2
(45) Date of Patent: May 31, 2011

(54) WINDSHIELD WIPING DEVICE, IN PARTICULAR FOR A MOTOR VEHICLE

(75) Inventor: Ulrich Metz, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 12/160,337

(22) PCT Filed: Nov. 21, 2006

(86) PCT No.: PCT/EP2006/068719
§ 371 (c)(1),
(2), (4) Date: Jul. 9, 2008

(87) PCT Pub. No.: WO2007/087908
PCT Pub. Date: Aug. 9, 2007

(65) Prior Publication Data
US 2010/0218329 A1    Sep. 2, 2010

(30) Foreign Application Priority Data

Jan. 13, 2006 (DE) .......... 10 2006 001 963
Mar. 30, 2006 (DE) .......... 10 2006 015 240

(51) Int. Cl.
B60S 1/04    (2006.01)
(52) U.S. Cl. .............. 296/96.15; 296/96.17; 296/96.2
(58) Field of Classification Search .......... 296/96.15, 296/96.16, 96.17, 96.2; 15/250.001, 250.3, 15/250.31
See application file for complete search history.

(56) References Cited

U.S. PATENT DOCUMENTS

| 6,168,223 | B1 * | 1/2001 | Egner-Walter | 296/96.17 |
| 6,705,660 | B2 * | 3/2004 | Egner-Walter et al. | 296/96.15 |
| 6,902,221 | B2 * | 6/2005 | Muehlpforte et al. | 296/96.17 |
| 7,503,615 | B2 * | 3/2009 | Albrecht et al. | 296/96.15 |
| 7,780,214 | B2 * | 8/2010 | Kraus et al. | 296/96.15 |
| 2003/0010164 | A1 | 1/2003 | Bayer et al. | |
| 2003/0052504 | A1 * | 3/2003 | Muehlpforte et al. | 296/96.15 |

FOREIGN PATENT DOCUMENTS

DE 3116821    11/1982
DE 19809630    9/1999

OTHER PUBLICATIONS

PCT/EP2006/068719 International Search Report.

* cited by examiner

Primary Examiner — Glenn Dayoan
Assistant Examiner — Gregory Blankenship
(74) Attorney, Agent, or Firm — Michael Best & Friedrich LLP

(57) ABSTRACT

The invention proposes a wiper device (10), in particular for a motor vehicle. This device comprises a plate (22), a first fastening means (34) and a second fastening means (36) and also a third fastening means (44), which is arranged outside the axis between the first fastening means (34) and the second fastening means (36). The third fastening means (44) has adjusting means (46) for tilting about a tilting angle of the plate (22). According to the invention, the adjusting means (46) allows only predetermined tilting angles ($\alpha$).

22 Claims, 4 Drawing Sheets

WINDSHIELD WIPING DEVICE, IN PARTICULAR FOR A MOTOR VEHICLE

BACKGROUND OF THE INVENTION

The invention relates to a windshield wiping device, in particular for a motor vehicle.

A windshield wiping device is known from DE-A-198 09 630 which comprises a first fastening means, a second fastening means and a third fastening means for fastening the windshield wiping device to the bodywork of the motor vehicle. To this end, a plate is arranged between the fastening means which bears the essential components of the windshield wiping device, for example the drive and the wiper bearings with the wiper shafts. The third fastening means is, in this case, arranged outside the axis formed by the first and second fastening means in the region of the drive of the windshield wiping device. Said third fastening means further comprises an adjusting means for tilting the plate by a tilting angle about the axis formed by the first and second fastening means. To this end, a thread-like damping element is provided as an adjusting means which cooperates with the plate. By rotating the damping element, the tilting angle of the plate is adjusted relative to the bodywork of the motor vehicle so that the angle between the windshield of the motor vehicle and the pendulum axis of the wiper shafts is altered in order to achieve an optimum wiping pattern.

Manufacturing tolerances which result from the production of the bodywork may be compensated, for example, by the adjusting means.

In this case, however, the relatively complicated adjustment of the tilting angle is difficult as the fastening has to be fixed after adjusting the tilting angle. Frequently, fixing the damping element leads to further alterations to the adjustment, so that subsequent adjustment is required, or a costly specific tool is required so that the adjustment remains reliably maintained during fixing.

SUMMARY OF THE INVENTION

The windshield wiping device according to the invention with the features of the main claim has the advantage that the adjusting means only allows predetermined tilting angles. In this manner, it is avoided that the adjusted tilting angle is altered again during fixing, but an accurate adjustment of the tilting angle is still possible.

The measures set forth in the sub-claims result in advantageous developments and improvements of the features provided in the main claim.

It is particularly advantageous if latching means for predetermining the predetermined tilting angles are provided on the third fastening means. Latching means are simple to manufacture and have a long service life.

In a simple embodiment, the latching means are formed by latching cams and latching connectors.

Easy adjustment is advantageously achieved by the latching cams and/or latching connectors being able to be moved relative to one another in a tilting plane defined by the tilting.

For accurate adjustment of the tilting angle, it is advantageously provided that the predetermined tilting angles are provided in steps of 0.5 to 5 degrees, in particular 0.8 to 3 degrees, preferably between 1 and 2 degrees.

A particularly secure connection is achieved if the third fastening means comprises a fixing means which cooperates with an opening. In this case screw, clip or clamp connections are advantageously provided as fixing means which advantageously cooperate with an, in particular, curved slot.

A particularly comfortable adjustment and a secure fixing of the tilting angle is achieved by the third fastening means comprising a rotating element which may be rotated about the fixing means.

It is also advantageous if the fixing means is arranged between the rotating element and the latching means.

In a simple and cost-effective embodiment, the third fastening means advantageously comprises a rotating body on which the rotating element and the latching cam or the latching connectors are arranged and which is borne by the fixing means. It is also advantageous if the fixing means is arranged in the pivot point of the rotating body, in particular if it forms the rotating shaft thereof.

A rotational aid on the rotating body, which is configured in particular as a lever, advantageously results in a rapid and easy adjustment of the tilting angle.

BRIEF DESCRIPTION OF THE DRAWINGS

An embodiment of the invention is shown in the drawings and explained in more detail in the following description, in which.

DETAILED SUMMARY

Figure 1:
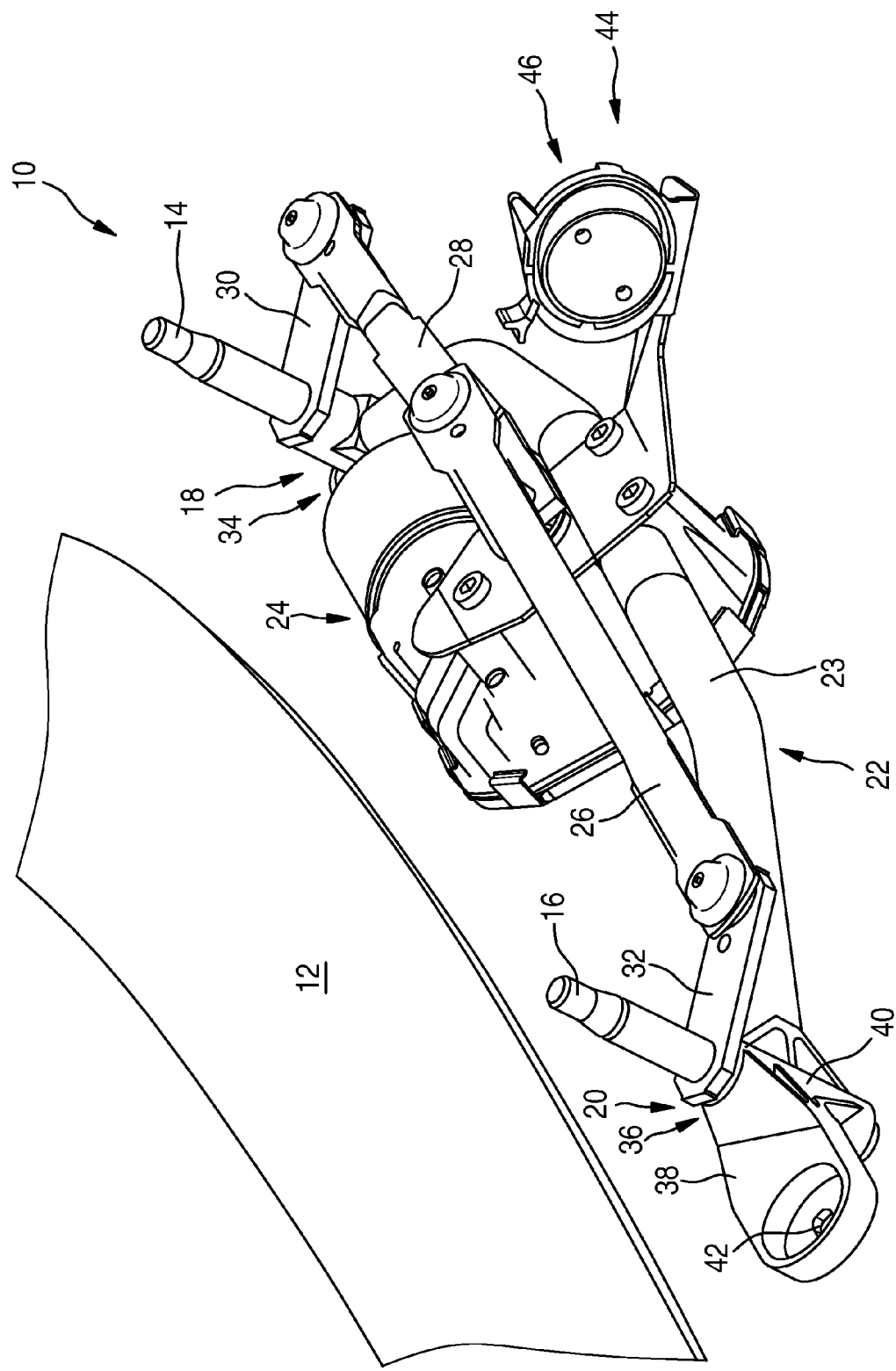
FIG. 1 shows a windshield wiping device according to the invention in a perspective view.

A windshield wiping device 10 according to the invention is shown in FIG. 1 in the assembled position in a motor vehicle. The windshield wiping device 10 is arranged in front of a windshield 12 and fastened to the vehicle bodywork, which is not shown in this case for reasons of clarity. The windshield wiping device 10 comprises a first wiper shaft 14 as well as a second wiper shaft 16 which project from the bodywork and, together with a plane formed by the windshield 12, enclose a tilting angle α. The wiper shafts 14, 16 in this case are respectively mounted in a first and/or second wiper bearing 18, and connected to one another by a supporting tube 23. Fastened to the supporting tube 23 between the first wiper bearing 18 and the second wiper bearing 20 is a wiper motor 24 as a drive, the output shaft thereof driving the wiper shafts 14, 16 via a mechanism made up of push rods 26, 28 and cranks 30, 32. As a result, a plate 22 is formed by the supporting tube 23 which bears the essential components such as the drive 24 and the wiper bearings 18, 20.

In the region of the first wiper bearing 18 and thus at one end of the longitudinal extension of the windshield wiping device 10, the first fastening means 34 is arranged and thus forms a first fastening point, at which the plate 22 is fastened to the bodywork. In the region of the second wiper bearing 20 and thus at the other end of the longitudinal extension of the windshield wiping device 10, the second fastening means 36 is arranged and thus forms a second fastening point for the plate 22. The second fastening means 36 which is configured substantially the same as the first fastening means 34, comprises a fastening portion 38 which is integrally formed with a tubular bearing portion 40 of the wiper bearing 20 supporting the second wiper shaft 16.

The fastening portion 38 is of substantially elongate shape and fastened at one end of its longitudinal extension to the bearing portion 40. At the other end of the fastening portion a fixing lug 42 is arranged, by means of which an, in particular, releasable fastening element, for example a screw or a turn-lock fastener and/or plug fastener, may be provided for fastening the plate 22 of the windshield wiping device 10 to the bodywork of the motor vehicle. For damping vibrations, damping elements are provided in the region of the fixing lug 42 which in this case are not shown for reasons of clarity. Said damping elements also allow easy tilting of the plate 22.

If the plate 22 of the windshield wiping device 10 is fastened to the bodywork of the motor vehicle by means of the first and second fastening means 34, 36, the plate 22 may, therefore, still be tilted about an axis formed by the two fastening means 34, 36. Said tilting angle is relatively small, generally encompassing only a few degrees, but is sufficient to compensate for manufacturing tolerances of the vehicle bodywork and the windshield wiping device 10. Similarly, different tilting angles α may be provided and adjusted for different types of vehicle.

In order to avoid inadvertent tilting and thus to achieve stable fastening, a third fastening means 44 is provided which is arranged outside the axis formed by the first fastening means 34 and the second fastening means 36. The third fastening means 44 is arranged in the central third of the supporting tube 23, for example in the region of the wiper motor 24, along the longitudinal extension of the windshield wiping device 10. The third fastening means 44 thus comprises an adjusting means 46 for adjusting the tilting angle α. The adjusting means 46 is, in this case, configured such that only predetermined tilting angles $α_1, α_2 \ldots, α_n$ are possible.

Figure 2:
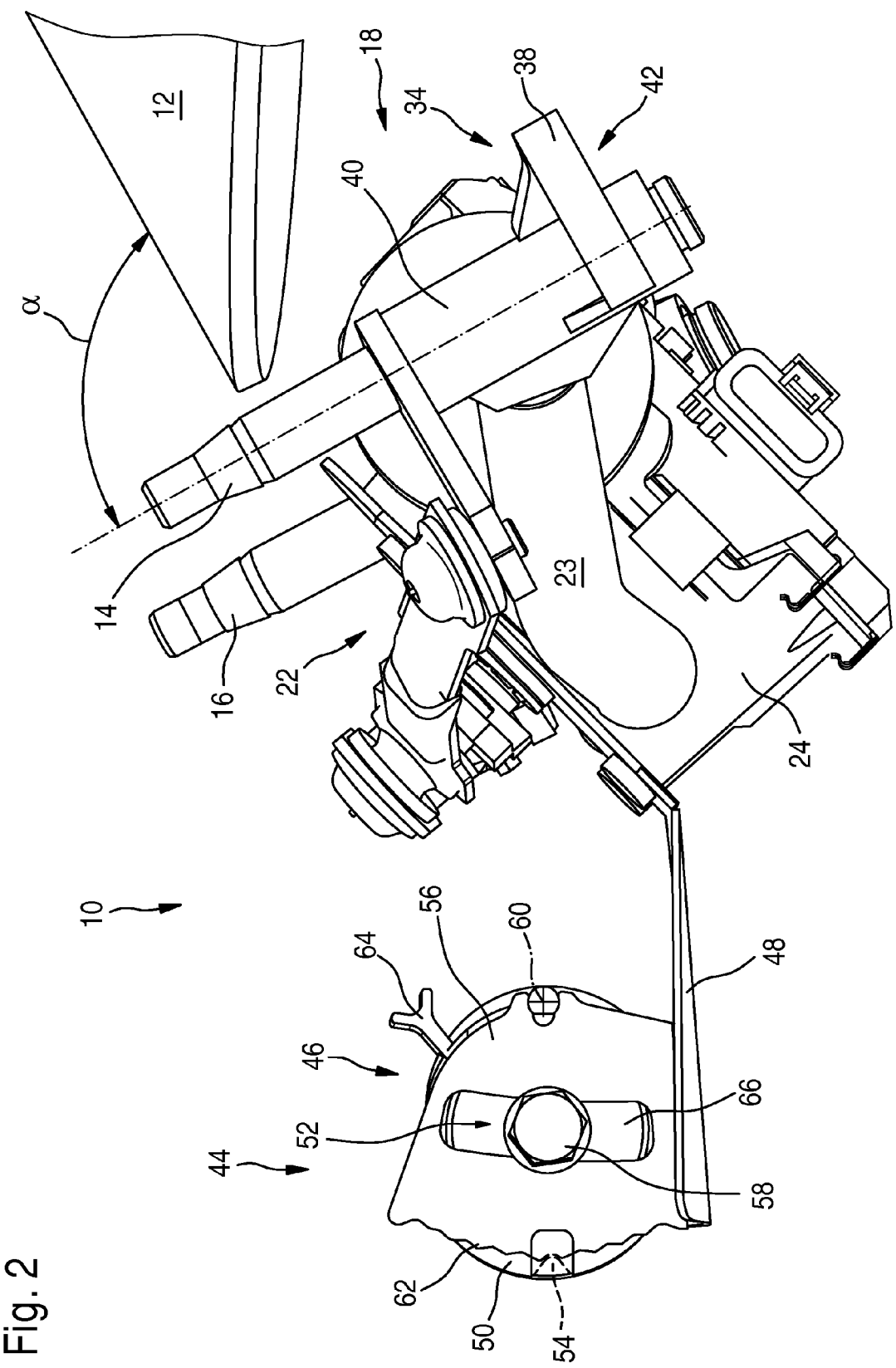
FIG. 2 shows a windshield wiping device according to the invention in a side view.

The windshield wiping device 10 according to the invention, as well as the windshield 12, are shown in schematic side view in FIG. 2. In the foreground, the first wiper bearing may be seen with the bearing portion 40 and the first fastening means 34. The first fastening means 34 comprises the fastening portion 38 and the fixing lug 42. In the region of the drive 24, a fastening plate 48 is arranged on the plate 22, the third fastening means 44 being arranged on the free end thereof. The third fastening means 44 comprises, in this case, the adjusting means 46 and is connected to the vehicle bodywork via a decoupling element 52.

The adjusting means 46 substantially comprises a rotating body 50 on which a latching connector 54 is configured which engages in latching cams 56. Moreover, the adjusting means 46 comprises a latching portion 56 which is configured from the fastening plate 48 of the plate 22, which projects in the plane of the tilting angle α and is configured as a sheet metal portion.

The rotating body 50 is, in this case, fastened to the bodywork such that it may be rotated in the plane of the tilting angle α. To this end, in the center of the rotating body 50, a threaded bolt is arranged as a fixing means 58. In this case, the latching portion 56 fits snugly against the side of the rotating body 50 in the tilting plane and comprises an, in particular, curved slot 66, through which the fixing means 58 bearing the rotating body 50 is guided. For adjusting the predetermined tilting angle α, the rotating body 50 has a rotating element 60 which is arranged perpendicular to the tilting plane. Said rotating element engages in a notch or an opening as an engagement element 70 in the latching portion 56 of the fastening plate 48. On the side opposing the rotating element 60 relative to the fixing means 58, the latching connector 54 is fastened to the rotating body 50. Said latching connector engages in latching cams 62 which correspond to the latching connector 54 of the rotating body 50. For easier rotation of the rotating body 50 a lever is arranged as a rotational aid 64. The rotational aid 64 is, in this case, configured and/or arranged such that, on the one hand, a secure latching is provided between the latching connector 54 and the latching cams 62, as a result of the lever principle, and, on the other hand, the rotating body 50 may be adjusted by a mechanic without a tool. As a result, an inadvertent rotation of the rotating body 50 may be avoided.

If the rotational aid 64 is actuated, the rotating body 50 is set in rotation. As a result, the rotating element 60 is moved upwards on a circular path. As the rotating element 60 is connected to the latching portion 56 of the fastening plate 48, the latching portion 56 is also pulled upwards, so that the tilting angle α of the plate 22 is altered. So that only predetermined tilting angles α may be adjusted, the latching connector 54 meshes with the latching cams 62. If the desired tilting angle α is adjusted, the fixing means 58, together with the screw, may be tightened so that the adjusted tilting angle α may no longer be altered. In order to allow the movement of the latching portion 56, together with the fastening plate 48, the slot 66 is provided in the latching portion 56, in the region of the fixing means 58, through which the fixing means 58 is able to slide during the rotation process. In a variant of the invention, the latching cams 62 and the latching connector 54 may also be provided at a different point of the rotating body 50, for example at the slot 66 or in the region of the rotating element 60.

Figure 3:
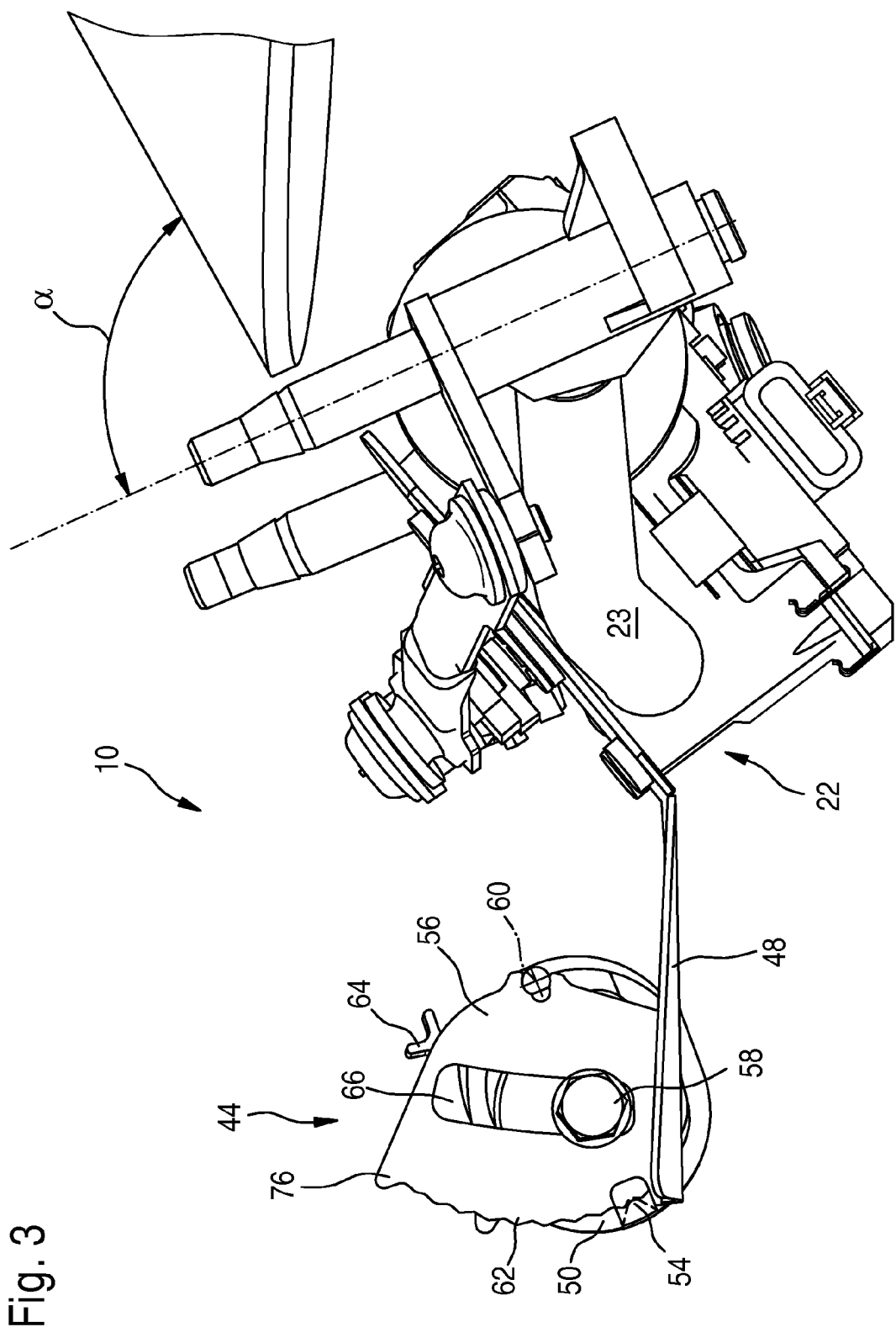
FIG. 3 shows a windshield wiping device according to the invention in a side view and FIG. 4 shows a fastening means of a windshield wiping device according to the invention in a side view.

In FIG. 3 the windshield wiping device 10 according to the invention is shown with the third fastening means 44 of FIG. 2 in a different angular position. In this case, the rotating body 50 has been pushed into an extreme position by the lever 64. The rotating body 50 has been rotated about its rotational axis counter-clockwise, so that the rotating element 60 has also been pushed upwards counter-clockwise. The rotational axis of the rotating body 50, in this case, extends precisely through the fixing means 58 which bears the rotating body 50. However, the fixing means 58 may also be arranged at a different point and be configured, for example, as a plug-in or clamping element. During the rotation of the rotating body 50, the latching connector 54 is pushed downwards along the latching cams as well as counter-clockwise. As a result of the rotating element 60 pushed upwards, the latching portion 56 and as a result also the fastening plate 48 has been pushed upwards and thus the tilting angle α has been adjusted into its minimum position.

Figure 4:
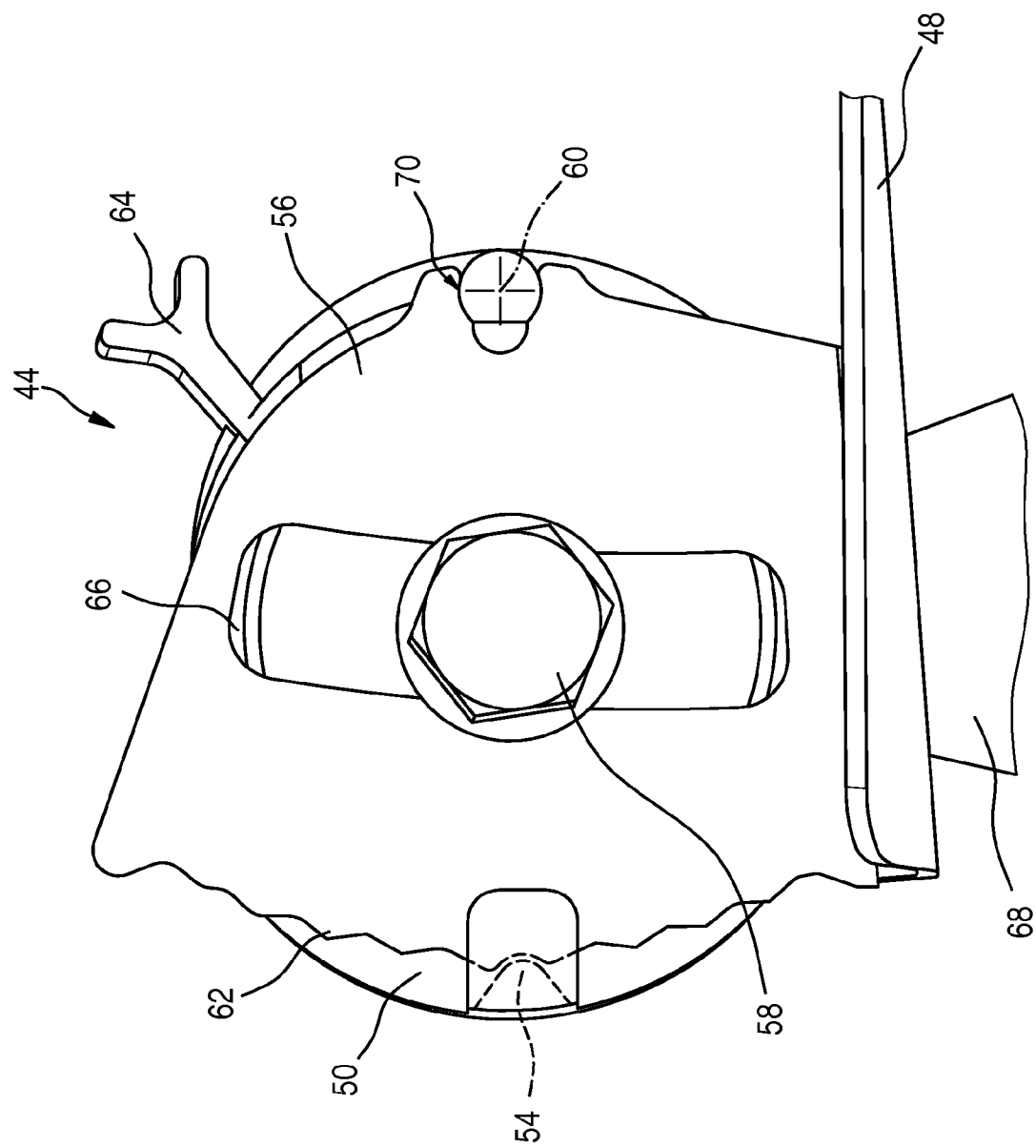

In FIG. 4 the third fastening means 44 is shown in detail. The rotating body 50 is connected to the vehicle bodywork by a fixing foot 68. The fixing foot 68 comprises an opening, through which the screw of the fixing means 58 extends and which bears the rotating body 50. The latching portion 56 connected to the fastening plate 48 is connected via the engagement element 70, which in this case is configured as a notch, to the rotating element 60 in a rotationally movable manner. The rotating element is arranged eccentrically on the rotating body 50, so that with a rotation of the rotating body 50 about its rotational axis a displacement of the rotating element 60 takes place. As the rotating element 60 is connected to the engagement element 70 in a rotationally movable manner, with a rotation of the rotating body 50 the engagement element 70 of the latching portion 56 is also displaced. So that only predetermined tilting angles α may be adjusted, the latching connector 54 is arranged on the side of the rotating body 50 remote from the rotating element 60 in the rotational plane of the rotational axis, and which, by the rotation of the rotating body 50, slides over the latching cams 62 of the latching portion 56. The latching portion 56 is formed from sheet metal. The latching connector 54 is formed from plastics, but may also be formed from metal, for example, sheet metal.

In order to avoid a subsequent adjustment of the tilting angle α, the fixing means 58 is provided which allows fixing after adjusting the desired tilting angle.

The fixing means 58 is arranged between the rotating element 60 and the latching connector 54. The rotating body 50, in this case, bears both the rotating element 60 and the latching connector 54. The direction of fixing, i.e. the force which produces the fixing, is exerted in this case perpendicular to the plane of the tilting angle α, so that the adjustment remains maintained during the fixing.

The latching means 72 formed by the latching cams 62 and the latching connector 54 may, in a variant of the invention, also be configured in the reverse manner, so that a latching connector is provided on the latching portion 56, which meshes with a plurality of latching cams on the rotating body 50.

The entire rotating body 50 may be produced from plastics, in particular in an injection-molding process. In particular, the rotational aid 64 may also be integrally formed with the rotating body 50.

Markings for the individual angular positions may also be applied to the latching portion 56, in particular for the zero position or central position. Via each cam 62, the tilting angle α of the plate 22 of the windshield wiping device 10 may be altered by an angular degree. In particular, on the rotating body 50 a projection 74 may be radially arranged, which is congruent with a corresponding further projection 76 arranged on the latching portion 56, when the tilting angle α is in the zero position or central position.

In a further variant of the invention, the latching may also be arranged perpendicular to the tilting direction. The latching portion 56 may in this case, for example, comprise holes or a wave-shaped arrangement and the latching connector 54 may extend out of the rotational plane of the rotating body 50 in the direction of the openings of the latching portion 56 and engage therein in order to achieve a smaller design. Naturally, the rotating body 50 may also comprise recesses as latching cams 62, which cooperate with a latching connector 54 arranged on the latching portion 56 and corresponding to the latching cam 62. In this case, the latching connector 54 may be provided, for example, as a connector which is embossed into the latching portion 56 formed from sheet metal.

The invention claimed is:

1. A windshield wiping device (10), comprising a plate (22), a first fastening means (34), a second fastening means (36) and a third fastening means (44), which is arranged outside an axis between the first fastening means (34) and the second fastening means (36), and the first, second and third fastening means (34, 36, 44) are provided for fastening the plate (22) to the motor vehicle, such that the third fastening means (44) comprises adjusting means (46) for tilting about the axis by a tilting angle (α) of the plate (22), characterized in that only predetermined tilting angles (α) are possible by the adjusting means (46), characterized in that the third fastening means (44) comprises a rotating element (60) which is rotatable about a fixing means (58) to adjust the tilting angle (α) between the predetermined tilting angles (α).

2. The windshield wiping device (10) as claimed in claim 1, characterized in that latching means (22, 24) for predetermining the predetermined tilting angles (α) are provided on the third fastening means (44).

3. The windshield wiping device (10) as claimed in claim 2, characterized in that the latching means (22, 24) are formed by latching cams (62) and latching connectors (54).

4. The windshield wiping device (10) as claimed in claim 3, characterized in that the latching cams (62) and/or latching connectors (54) may be moved relative to one another in a plane defined by the tilting.

5. The windshield wiping device (10) as claimed in claim 1, characterized in that the predetermined tilting angles (α) are provided in steps of 0.5 degrees to 5 degrees.

6. The windshield wiping device (10) as claimed in claim 1 characterized in that the third fastening means (44) comprises the fixing means (58) including one of a screw, clip or clamp connection, which cooperates with a curved slot (66).

7. The windshield wiping device (10) as claimed in claim 6, characterized in that the fixing means (58) is arranged between the rotating element (60) and a latching means (22, 24).

8. The windshield wiping device (10) as claimed in claim 1, characterized in that the third fastening means (44) comprises a rotating body (50) on which the rotating element (60) and a latching cam (62) or a latching connectors (54) are arranged and which is borne by the fixing means (58).

9. The windshield wiping device (10) as claimed in claim 1, characterized in that a rotating body (50) has a rotational aid (64) including a lever.

10. The windshield wiping device (10) as claimed in claim 1, characterized in that the predetermined tilting angles (α) are provided in steps of 0.8 degrees to 3 degrees.

11. The windshield wiping device (10) as claimed in claim 1, characterized in that the predetermined tilting angles (α) are provided in steps of between 1 degree and 2 degrees.

12. The windshield wiping device (10) as claimed in claim 4, characterized in that the predetermined tilting angles (α) are provided in steps of 0.5 degrees to 5 degrees.

13. The windshield wiping device (10) as claimed in claim 12, characterized in that the third fastening means (44) comprises the fixing means (58) including one of a screw, clip or clamp connection, which cooperates with a curved slot (66).

14. The windshield wiping device (10) as claimed in claim 13, characterized in that the third fastening means (44) comprises the rotating element (60) which may be rotated about the fixing means (58).

15. The windshield wiping device (10) as claimed in claim 14, characterized in that the fixing means (58) is arranged between the rotating element (60) and the latching means (22, 24).

16. The windshield wiping device (10) as claimed in claim 15, characterized in that the third fastening means (44) comprises a rotating body (50) on which the rotating element (60) and the latching cam (62) or the latching connectors (54) are arranged and which is borne by the fixing means (58).

17. The windshield wiping device (10) as claimed in claim 16, characterized in that the rotating body (50) has a rotational aid (64) including a lever.

18. The windshield wiping device (10) as claimed in claim 4, characterized in that the predetermined tilting angles (α) are provided in steps of 0.8 degrees to 3 degrees.

19. The windshield wiping device (10) as claimed in claim 4, characterized in that the predetermined tilting angles (α) are provided in steps of between 1 degree and 2 degrees.

20. The windshield wiping device (10) as claimed in claim 1, wherein the fixing means (58) selectively fixes the position of the rotating element (60) to fix the tilting angle (α) after adjustment of the tilting angle (α).

21. The windshield wiping device (10) as claimed in claim 20, wherein the rotating element (60) rotates about a second axis generally parallel to the axis between the first fastening means (34) and the second fastening means (36).

22. The windshield wiping device (10) as claimed in claim 21, wherein the fixing means (58) is a threaded fastener extending along the second axis.

* * * * *